United States Patent
Ishizeki et al.

(10) Patent No.: US 9,301,343 B2
(45) Date of Patent: Mar. 29, 2016

(54) WINDOW-GLASS HEATING DEVICE

(75) Inventors: Seiichi Ishizeki, Tokyo (JP); Tomotaka Sawada, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 1093 days.

(21) Appl. No.: 12/320,407

(22) Filed: Jan. 26, 2009

(65) Prior Publication Data

US 2009/0206068 A1    Aug. 20, 2009

(30) Foreign Application Priority Data

Feb. 19, 2008  (JP) .................................. 2008-037326
Feb. 19, 2008  (JP) .................................. 2008-037331

(51) Int. Cl.
| | |
|---|---|
| *B60L 1/02* | (2006.01) |
| *H05B 3/84* | (2006.01) |
| *B60S 1/02* | (2006.01) |
| *H05B 3/86* | (2006.01) |

(52) U.S. Cl.
CPC . *H05B 3/84* (2013.01); *B60S 1/026* (2013.01); *H05B 3/86* (2013.01); *H05B 2203/013* (2013.01)

(58) Field of Classification Search
CPC .................. B32B 17/10192; B32B 17/10229; H05B 2203/008; H05B 2203/035; B60S 1/026
USPC .............. 219/203, 522, 443.1, 494, 544, 503, 219/202, 543, 548, 486; 156/345.52, 156/345.51, 345.53; 118/59, 69, 500; 432/253, 258, 259; 269/21; 361/234
See application file for complete search history.

(56) References Cited

U.S. PATENT DOCUMENTS

| | | | | |
|---|---|---|---|---|
| 2,557,905 | A * | 6/1951 | Burton et al. .................. | 219/213 |
| 3,982,092 | A * | 9/1976 | Marriott ......................... | 219/203 |
| 5,354,966 | A * | 10/1994 | Sperbeck ...................... | 219/203 |
| 5,434,384 | A * | 7/1995 | Koontz ........................... | 219/203 |
| 5,496,989 | A * | 3/1996 | Bradford et al. .............. | 219/497 |
| 5,821,501 | A * | 10/1998 | Zorn .............................. | 219/219 |

(Continued)

FOREIGN PATENT DOCUMENTS

| | | |
|---|---|---|
| DE | 296 06 071 U1 | 7/1996 |
| DE | 101 20 098 A1 | 12/2002 |

(Continued)

OTHER PUBLICATIONS

German Search Report dated Dec. 17, 2009 and partial English translation thereof.

*Primary Examiner* — Tu B Hoang
*Assistant Examiner* — Diallo I Duniver
(74) *Attorney, Agent, or Firm* — McGinn IP Law Group, PLLC.

(57) ABSTRACT

A window-glass heating device for providing each adequate heat amount in accordance with each parts of the glass and for securing the good visibility to a driver, comprises: a first heater having a transparent heating film attached on the whole surface of the vehicle window glass; a second heater having a transparent heating film attached on a part of the surface of the vehicle window glass and being arranged at least overlapped with the first heater; a heating-requirement detector for detecting at least one of heating requirements such as the outside temperature, the inside temperature and any input through the operational equipments of vehicle inside; and a heating controller for controlling heat amount of the first and second heaters depending on the heating requirement.

19 Claims, 9 Drawing Sheets

(56) References Cited

U.S. PATENT DOCUMENTS

| | | | | |
|---|---|---|---|---|
| 5,973,301 A | * | 10/1999 | Inoue | 219/522 |
| 6,163,013 A | * | 12/2000 | King et al. | 219/203 |
| 6,888,101 B2 | * | 5/2005 | Davis | 219/201 |
| 6,917,019 B2 | | 7/2005 | Richter | |
| 7,026,577 B2 | | 4/2006 | Maeuser et al. | |
| 7,301,125 B2 | * | 11/2007 | Davis | 219/201 |
| 7,652,226 B2 | * | 1/2010 | Muromachi et al. | 219/203 |
| 7,883,609 B2 | * | 2/2011 | Petrenko et al. | 204/242 |

FOREIGN PATENT DOCUMENTS

| | | | | |
|---|---|---|---|---|
| DE | 101 60 806 A1 | | 6/2003 | |
| DE | 103 35 979 A1 | | 12/2004 | |
| JP | 02046683 A | * | 2/1990 | H05B 3/86 |
| JP | 5-147500 | | 6/1993 | |
| WO | 2005/048657 | * | 5/2005 | 219/203 |

* cited by examiner

WINDOW-GLASS HEATING DEVICE

CROSS REFERENCE TO RELATED APPLICATION

This application is based on Japanese Patent Application Nos. 2008-037326 and 2008-037331 filed on Feb. 19, 2008, each disclosure of which is incorporated herein by reference.

BACKGROUND OF THE INVENTION

1. Field of the Invention

The present invention relates to a window-glass heating device for heating a window glass for a vehicle such as automobile in order to secure the visibility thereof, specifically, in such a manner as to attach a conductive thin film to the window glass and to electrify it.

2. Description of the Related Art

A window glass for an automobile or the like is provided with a heating device to prevent fog, frost, freezing, ice and snow attached on the window glass from occurring in order to secure a visibility of a driver.

For example, Patent Document 1 describes that a glass heating means provided with a glass heater and an air conditioner blowing hot air to the window glass are controlled in accordance with visibility state of the vehicle window in order to eliminate icing and condensation conditions of the window.

Also, Patent Document 2 describes that a glass heating wire is formed in the rear window glass of a vehicle as a defogger, and that an electric power supply channel from a power source to the glass heating wire is switched by a simple circuit to reduce a battery load. Besides, Patent Document 3 describes that a resistance-heating wire is disposed in-between a laminated glass in a windshield wiper reset area in order to prevent the windshield wiper from freezing on and adhering with the front window.

Further, Patent Document 4 describes that a window glass for building is provided with an exothermic paint, a heating carbon plate, a resistance-heating metallic element, a silicone sheet like heating element and the like on its surface to heat the window glass.

Patent Document 1: Japanese Patent application Laid-Open No. H05-147500
Patent Document 2: Japanese Patent application Laid-Open No. H11-170986
Patent Document 3: Japanese Patent application Laid-Open No. H10-189232
Patent Document 4: Japanese Patent application Laid-Open No. H10-139492

SUMMARY OF THE INVENTION

In a heating device for heating a window glass of a vehicle such as automobile, the needed amount of heat is different each area of the window glass.

At snowfall, for example, in areas around right and left A-pillars of a windshield, ice and snow which has been scraped up by windshield wipers may become lumps and grow into a disturbance of a driver's view. Snowy lumps require much more heat amount to melt as compared with melting it by a normal defroster or the like.

In the case of blowing hot air from an air conditioner to do so, local heating is somewhat possible by rectifying the hot air, but the practical heated area is restricted because the placement of the jet is limited. In addition, when a large amount of heat is required, a temperature inside the vehicle also rises, which may cause a driver's flush.

Besides, a heating wire such as resistance-heating wire is so opaque to be incapable of arranging on the windshield within driver's view. Specifically, when a large amount of heat is needed, the resistance wire may result in enlargement in diameter or arrangement in density, so that it has an effect on the visibility. The object of the present invention is to provide a window-glass heating device which can supply an adequate amount of heat to each portion of the window glass and also keep a good visibility for driver.

The present invention solves the aforementioned problems by solutions as follows.

The first aspect of the present invention is concerned with a window-glass heating device which comprises first heating means having a first heat generating film being transparent or semi-transparent and attached on an area including a central region of an automotive window glass; second heating means having a second heat generating film being transparent or semi-transparent and attached in a partial area of the automotive window glass; heating-requirement detecting means for detecting at least one of heating requirements such as an outer air condition, an inner air condition and an operational input from an operational equipment provided in a compartment of a vehicle; and heating control means for controlling heat amount in the first and second heating means depending on the heating requirement.

In the above description, the outer and inner air conditions (air conditions of the vehicle interior and exterior) include, for example, the outside temperature, the inside temperature, temperature difference between the vehicle exterior and interior, outside and inside air humidity, and the like.

The second aspect of the present invention is concerned with the window-glass heating device according to the first aspect, wherein: the first heating means has a heat generating film attached on a substantially whole surface of the window glass; and at least one part of the second heating means is overlapped on the first heating means.

The third aspect of the present invention is concerned with the window-glass heating device according to the second aspect, the heating control means of which heats the first heating means also when heating the second heating means.

The fourth aspect of the present invention is concerned with the window-glass heating device according to the second aspect, the second heating means of which is disposed farther outside of the window glass than the first heating means.

The fifth aspect of the present invention is concerned with the window-glass heating device according to the second aspect, the second heating means of which is provided in at least one area of the window glass such as an area adjacent to a windshield wiper waiting position, an area near a movable end of the wiper opposite to the windshield wiper waiting position, and an area facing an automotive surrounding photographing device.

The sixth aspect of the present invention is concerned with the window-glass heating device according to the second aspect, wherein: the window glass is a laminated glass overlapped by an outer glass and an inner glass; the first heating means is attached on a surface at the side of the vehicle outside of the inner glass; the second heating means is attached on a surface at the side of the vehicle inside of the outer glass; and a non-conductive transparent film is arranged between the first heating means and the second heating means.

The seventh aspect of the present invention is concerned with the window-glass heating device according to the first aspect, wherein: the partial area is a peripheral area of the window glass; and the second heating means is provided on the peripheral area of the window glass adjacent to the first heating means.

The eighth aspect of the present invention is concerned with the window-glass heating device according to the seventh aspect, the second heating means of which has a heat generating film attached on an area adjacent to the heat generating film of the first heating means.

The ninth aspect of the present invention is concerned with the window-glass heating device according to the eighth aspect, the second heating means of which is provided in at least one area of the window glass such as an area adjacent to a windshield wiper waiting position, an area opposite to the windshield wiper waiting position, and an area facing an automotive surrounding photographing device.

The tenth aspect of the present invention is concerned with the window-glass heating device according to the seventh aspect, wherein: the heating requirement includes at least one of an inside-outside temperature difference and an outside temperature; and the heating control means switches heating conditions between a first heating condition caused by operating only the second heating means and a second heating condition caused by operating both the first and second heating means depending on the heating requirements.

The eleventh aspect of the present invention is concerned with the window-glass heating device according to the seventh aspect, wherein: the heating requirement includes at least one of an inside-outside temperature difference and an outer temperature; and the heating control means changes the respective heat amount of the first and second heating means depending on the heating requirements.

According to the present invention, it is possible to obtain following effects.

(1) Since the first heating means is disposed at the area including a central region of an automotive window glass, the second heating means being disposed at a partial area of the automotive window glass, and also the heat amount of each heating means is controlled depending on a heating requirement, it can be effectively carried out to melt ice lumps in the area provided with the second heating means.

(2) Owing to the first heating means provided on the substantially whole surface of the window glass and the second heating means, which is overlapped on the first heating means, provided on a partial area of the window glass, the following effects can be obtained through controlling the heat amount of each heating means in accordance with a various heating requirements.

a) Since the area provided with the second heating means heats both the first and second heating means so that a large amount of heat can be obtained, it is possible to effectively melt an ice lump attached on the automotive window glass under a cold condition.

b) In the case that the heating requirement in the area provided with the second heating means is relatively small, only the second heating means is heated to prevent the window glass from freezing or the like.

c) The defroster effect also can be obtained through equally heating the whole surface of the window glass with only the first heating means.

(3) Arranging the second heating means at the outside of the vehicle for locally heating, ice-snow lumps attached on the outside portion of the window glass can be melted effectively. Also, arranging the first heating means at the inside of the vehicle, the whole portion of the window glass is mainly heated to improve an defogging effect.

(4) Arranging the second heating means in the areas near the wiper waiting position, it is possible to prevent the wiper from freezing or attaching on the window glass.

(5) Arranging the second heating means in the area near the movable end of the wiper opposite to the wiper waiting position, it is possible to prevent snow scratched by the wiper from growing ice lumps (6) Arranging the second heating means in an area facing an automotive surrounding photographing device, it is possible to prevent any disturbance of photographing by fog or freeze on the window glass, i.e., a deterioration of recognition performance to the photographed result from occurring.

(7) The first heating means is attached on the vehicle outside surface of the inner glass in the laminated glass, and the second heating means is attached on the vehicle inside surface of the outer glass in the laminated glass, so that it is possible to protect each of heating means by the inner glass and outer glass, resulting in improving durability thereof. In addition, the nonconductive and transparent intermediate film is arranged between the inside and outside heating means, so that the respective heat-generating films for each heating means can be isolated each other.

(8) In the case that the window glass is to be heated in a specified areas such as the wiper waiting position or position near a movable end of the wiper opposite to the wiper waiting position, i.e., in areas adjacent to the A-pillars thereof, heating only the heating means provided near the areas enables the effective heating to be accomplished. Hereby, the periphery portions of the window glass, which is apt to be fogged up, can be mainly heated efficiently, and it can prevent snow scratched by the wiper from growing ice lumps, or prevent a wiper blade from freezing and being attached on the window glass. Further, in the case that the whole surface of window glass has to be heated for preventing the glass from fogging up, the whole surface of the window glass can be heated through heating both the first and second heating means.

In addition, since the window glass is directly heated in the above case, the better energy efficiency in comparison with the other ways for eliminating fog, i.e., heating glass through blowing hot air onto it utilizing an air conditioner, or dehumidifying the air inside the vehicle can be obtained.

(9) Since the heat generating film of the second heating means is transparent or semitransparent in the same way as the heat generating film of the first heating means, in which both the films are adjacent to each other, the second heating means can be disposed within the field of the vision in the window glass, to improve the freedom degree on design.

(10) Depending on any heat generating requirement based on at least one of the inside-outside temperature difference and outside temperature, it is possible to switch between the first heating condition heating only the second heating means and the second heating condition heating both the first and second heating means. In addition, depending on the heating requirement, it is also possible to change each heat amount of the first and second heating means. These features can give the driver the best heating condition in accordance with the weather automatically. In addition, these advantages allows the user to secure a good visibility during traveling even in a cold region without a complicated operation conducted by the user.

The above and other objects, features and advantages of the invention will become more clearly understood from the following description referring to the accompanying drawings.

DESCRIPTION OF THE PREFERRED EMBODIMENTS

The present invention has solved an object of providing a window-glass heating device for obtaining adequate heat amount for each part of the glass and for securing the good visibility of a driver by the following means, i.e., through: providing a first heating film attached on a whole surface of a vehicle window glass, and a second heating film attached on an area adjacent to an A-pillar and a windshield wiper waiting position requiring relatively greater heat amount; and disposing the second heating film overlapping on the first heating film; and further controlling the heat amount of each heating film depending on heating requirements estimated by outer and inner temperatures, or a driver's switch operation in temperature. In addition, the object of the present invention has been solved through providing a heating means independently having transparent conductive films on the central and peripheral areas of window glass, respectively, so as to electrify independently each other, wherein, first, an end portion of the heating means heats the film provided on the peripheral area depending on an increased heating requirement such as cases of a decent of the outer temperature and an enlargement of the inside-outside temperature difference, and further all the heating portions are heated if the heating requirement increases additionally.

[The First Embodiment]

Hereinafter, the first embodiment of a window-glass heating device according to the present invention will be explained referring to FIGS. 1 to 5.

Figure 1:
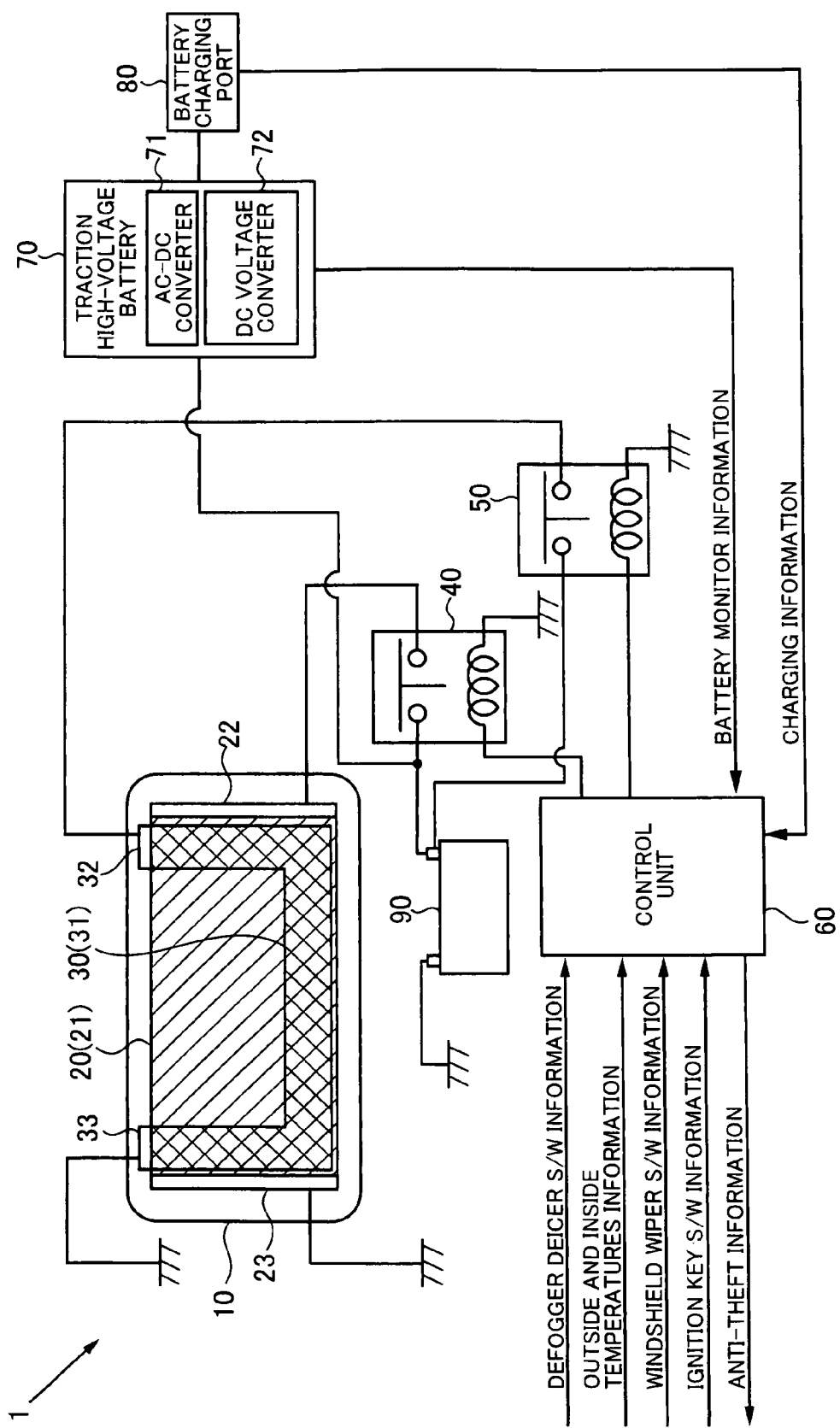
FIG. 1 is a block diagram showing a construction of the window-glass heating device in accordance with the first embodiment of the present invention.

The window-glass heating device according to the first embodiment is provided on the windshield of an automobile such as an engine-electric hybrid car having, for example, a plug-in function. FIG. 1 is a block diagram showing a structure of a window-glass heating device 1 according to the first embodiment. The window-glass heating device 1 includes an inside heater 20 and an outside heater 30 for heating a window glass 10, relays 40 and 50 for supplying electric power into each heater, a control unit 60 for controlling each relay, and the like.

In addition, the window-glass heating device 1 is connected with a traction battery 70, a battery charging port 80, a battery for electrical equipments 90 and the like.

The window glass 10 is made of a laminated glass having a curved-surface and formed with general elongated and rectangular shape. The window glass 10 is arranged adjoining a front edge of a roof (not illustrated) in its upper end portion, and its lower end portion is arranged adjoining a cowl top part (not illustrated). In addition, its right and left side end portions are positioned adjoining the front edges of A-pillars (not illustrated).

In addition, the window glass 10 is provided with a windshield wiper device (not illustrated). The windshield wiper device includes a wiper blade, which has a waiting position near a lower end portion of the window glass 10 at the time of non-use, and swings from this position to the A-pillar at the time of use.

Figure 2:
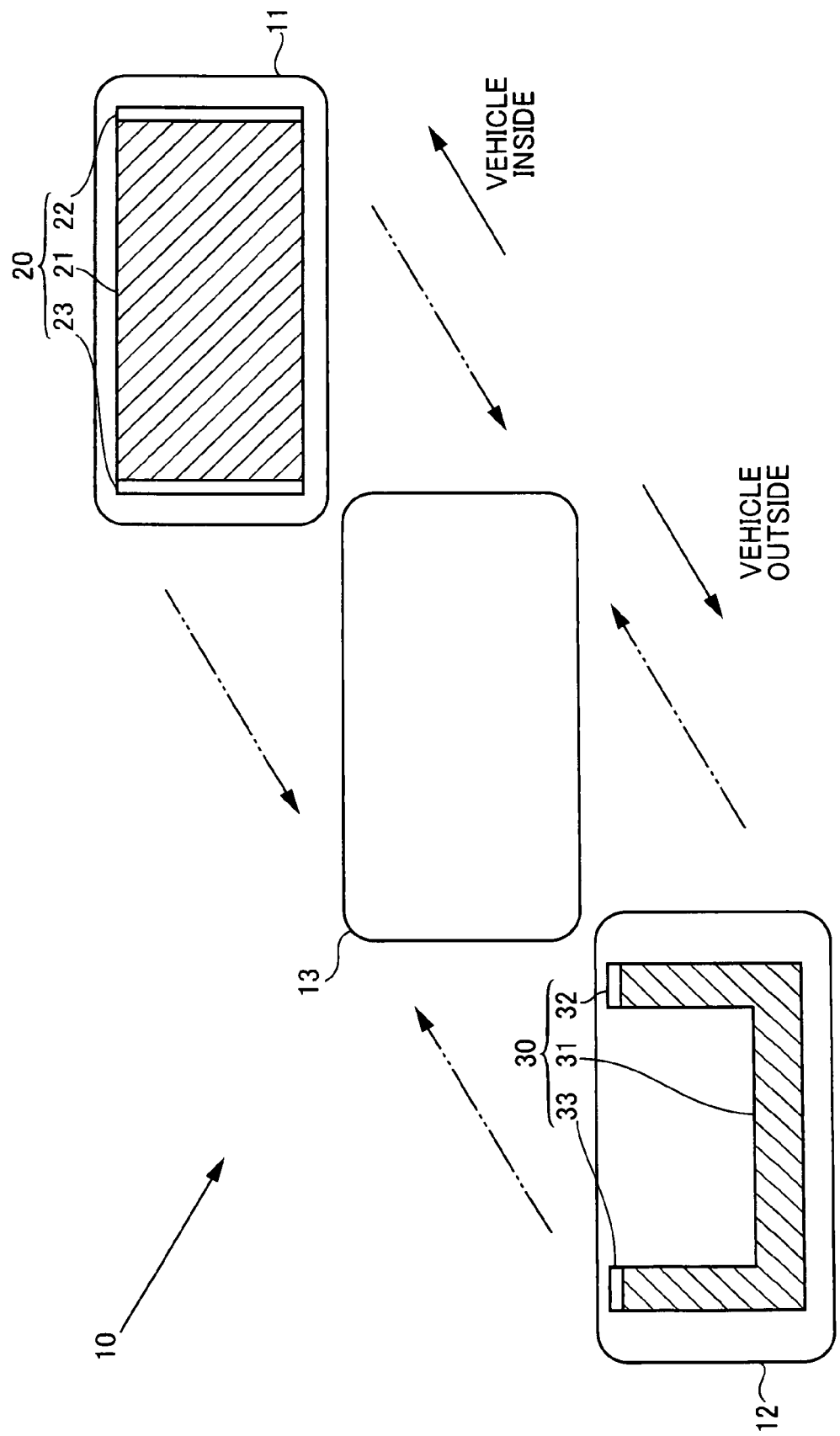
FIG. 2 is a exploded schematic view of a window glass of the window-glass heating device shown in FIG. 1.
Figure 3:
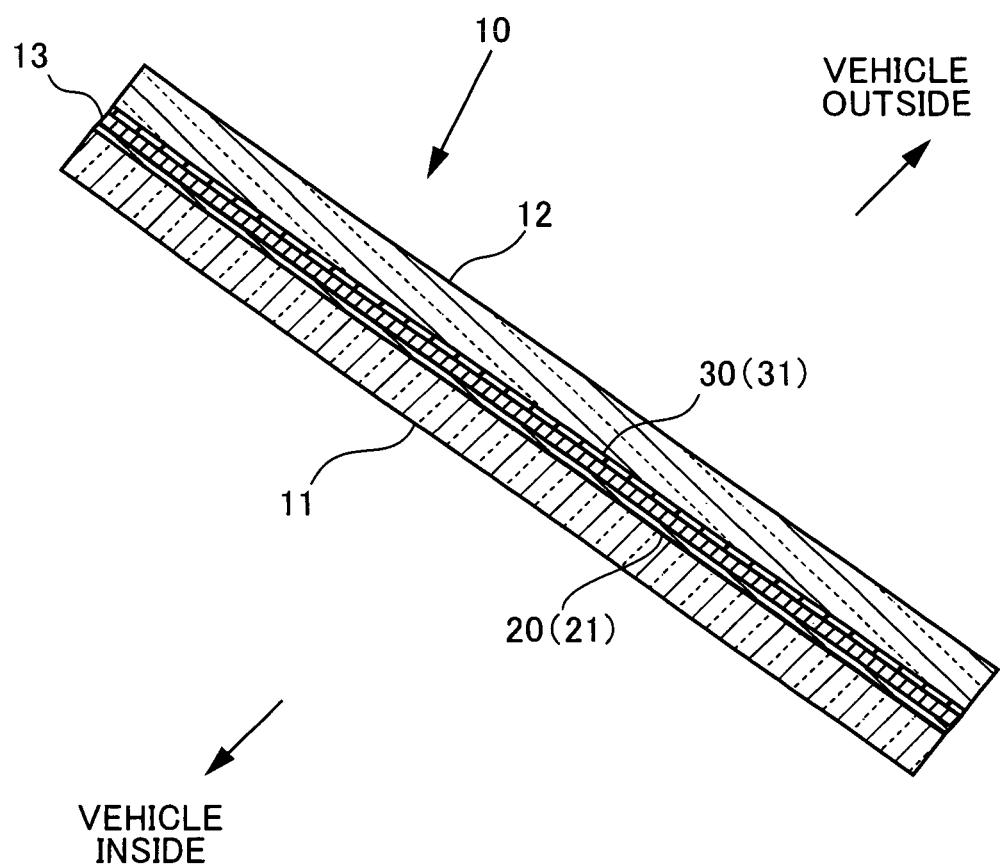
FIG. 3 is a partially cross-sectional view of the window-glass heating device shown in FIG. 1.

FIG. 2 is a exploded schematic view of the window glass 10. FIG. 3 is a partially cross-sectional view of the window glass 10 including both the inside and outside heaters 20, 30.

The window glass 10 includes an inner glass 11, an outer glass 12, and an intermediate film 13. The inner glass 11 and the outer glass 13 are laminated and adhered each other, so as to make one layer glass sheet. The inner glass 11 is arranged at the inside of the vehicle, and the outer glass 12 being arranged at the outside of the vehicle. The intermediate film 13 is a transparent and non-conductive film, which is provided between the inner glass 11 and the outer glass 12, and formed in film-shape with material such as resin.

The inside heater 20 is attached on a vehicle exterior surface of the inner glass 11. The inside heater 20 is the first heating means according to the present invention. The inside heater 20 is provided with components such as a heat generating film 21, electrodes 22, 23 and the like.

The heat generating film 21 is a thin film made of tin oxide, which is formed by evaporation on a surface of the inner glass 11 at the side of the vehicle exterior. The heat generating film 21 is transparent or semi-transparent, and also conductive, to generate heat by electrifying. The heat generating film 21 is formed with elongated and rectangular shape and arranged on almost whole surface of the inner glass 11 except its periphery part.

The electrodes 22 and 23 are for feeding electric current into the heat generating film 21, and they are provided on both the right and left end parts of the conductive film 21, respectively. The electrode 22 is connected to the relay 40, and the electrode 23 is connected to ground.

The outside heater 30 is attached on a vehicle's interior surface of the outer glass 12. The outside heater 30 is the second heating means according to the present invention. The outside heater 30 is provided with components such as a heat generating film 31, electrodes 32, 33 and the like.

The heat generating film 31 is formed by evaporation on the surface of the outer glass 12 at the side of the vehicle interior. In the same way as the aforementioned heat generating film 21 of inside heater 20, the heat generating film 31 is a thin film made of tin oxide or the like. The heat generating film 31 is transparent or semi-transparent, and also conductive, to generate heat by electrifying. The heat generating film 31 is disposed on areas corresponding to the lower part and the right and left end parts of the heat generating film 21, and is formed with substantial U-shape as shown in FIG. 2. Moreover, the lower end part of the heat generating film 31 is arranged on an area of the windshield wiper waiting position and its neighborhood, where the wiper blade is in the condition of stopping. In addition, both the right and left end parts of the heat generating film 31 are adjacent to the A-pillar.

The electrodes 32 and 33 feed electric current into the heat generating film 31, and are provided on the upper end parts of both the right and left end parts of the conductive film 31, respectively. The electrode 32 is connected to the relay 50, and the electrode 32 is connected to ground.

The relay 40 is for switching power supply from the traction battery 70 and the electrical equipments battery 90 to the inside heater 20. On the other hand, the relay 50 is for switching power supply from the traction battery 70 and the electrical equipments battery 90 to the outside heater 30.

The control unit 60 includes an ECU for controlling the relay 40 and the relay 50, to control the heat amount of the inside heater 20 and outside heater 30. Via a vehicle-mounted LAN such as CAN (not illustrated), the control unit 60 acquires defogger-deicer switch information, inside-outside temperature information, windshield wiper switch information, ignition switch information, battery monitor information, charging information and the like, and executes various controls on the basis of these information.

The control unit 60 functions as heat-generating-requirement detecting means and also heat-generating control means through cooperating with the relay 40 and 50 according to the present invention.

The defogger-deicer switch information is concerned with the operational states of a defogger switch and a windshield-wiper-deicer switch (not illustrated). The defogger switch is operated when the window glass 10 is fogged up or when preventing it from fogging. The wiper deicer switch is operated when the wiper blades are frozen up or when preventing it from freezing.

The inside-outside temperature information is concerned with the temperature of the vehicle exterior (outside temperature) and the temperature of the vehicle interior (inside temperature) which are detected by temperature sensors provided inside and outside the vehicle, respectively.

The wiper switch information is concerned with the operational states of a windshield wiper switch (not illustrated). The ignition switch information is concerned with operational states of the ignition switch (not illustrated). The ignition switch has four operational states, that is, "OFF", "ACCESSORY", "ON", and "START". The "ACCESSORY" is for feeding electric power only into a predetermined sort of the electrical equipments at the time of vehicle stop. The "ON" is utilized at the time of running of vehicle, and it electrifies almost all electrical equipments. The "START" is for electrifying a starter motor at the time of starting an engine. Moreover, each of aforementioned switches is arranged on, for example, an installment panel in a vehicle compartment, and a user such as driver operates them. The battery monitor information is concerned with a state of charge (SOC) of the traction battery 70. The charging information is concerned with charging from the battery charging port 80 or not.

Besides, the control unit 60 has a function for outputting anti-theft information. This will be described later in detail.

The traction battery 70 feeds electricity into a motor (not illustrated), which is utilized as power source for traveling together with an engine (not illustrated). The traction battery 70 has a secondary battery such as a lithium-ion battery, a nickel-metal-hydride battery or the like. In addition, the traction battery 70 is provided with an AC-DC converter 71 and a DC voltage converter 72.

The battery charging port 80 is a terminal for charging the traction battery 70 from a power supply of the vehicle exterior. In addition, it is also a terminal utilized for preventing the window glass from fogging and freezing up through feeding a little weak electric current into the window-glass heating device 1 at the time of vehicle stop. As the power source, a power source for domestic or commercial use such as a power source of AC 100 volts, AC 200 volts or the like may be utilized. In this way, if the external power supply is utilized for defogging and the like at the time of vehicle stop, more amount of the charged power in the battery can be utilized for traveling only after starting the drive of vehicle, resulting in an improvement of running performance and in reducing a battery capacity. This advantage makes it possible to cause reducing in weight and in cost.

The battery charging port 80 has a function for supplying information related to charging to the control unit 60 during charging (plug-in charging) from outside.

The electrical equipments battery 90 feeds electricity into the electrical equipments other than the traction motor. The electrical equipments battery 90 includes a secondary battery such as a lead-acid battery or the like.

Figure 4:
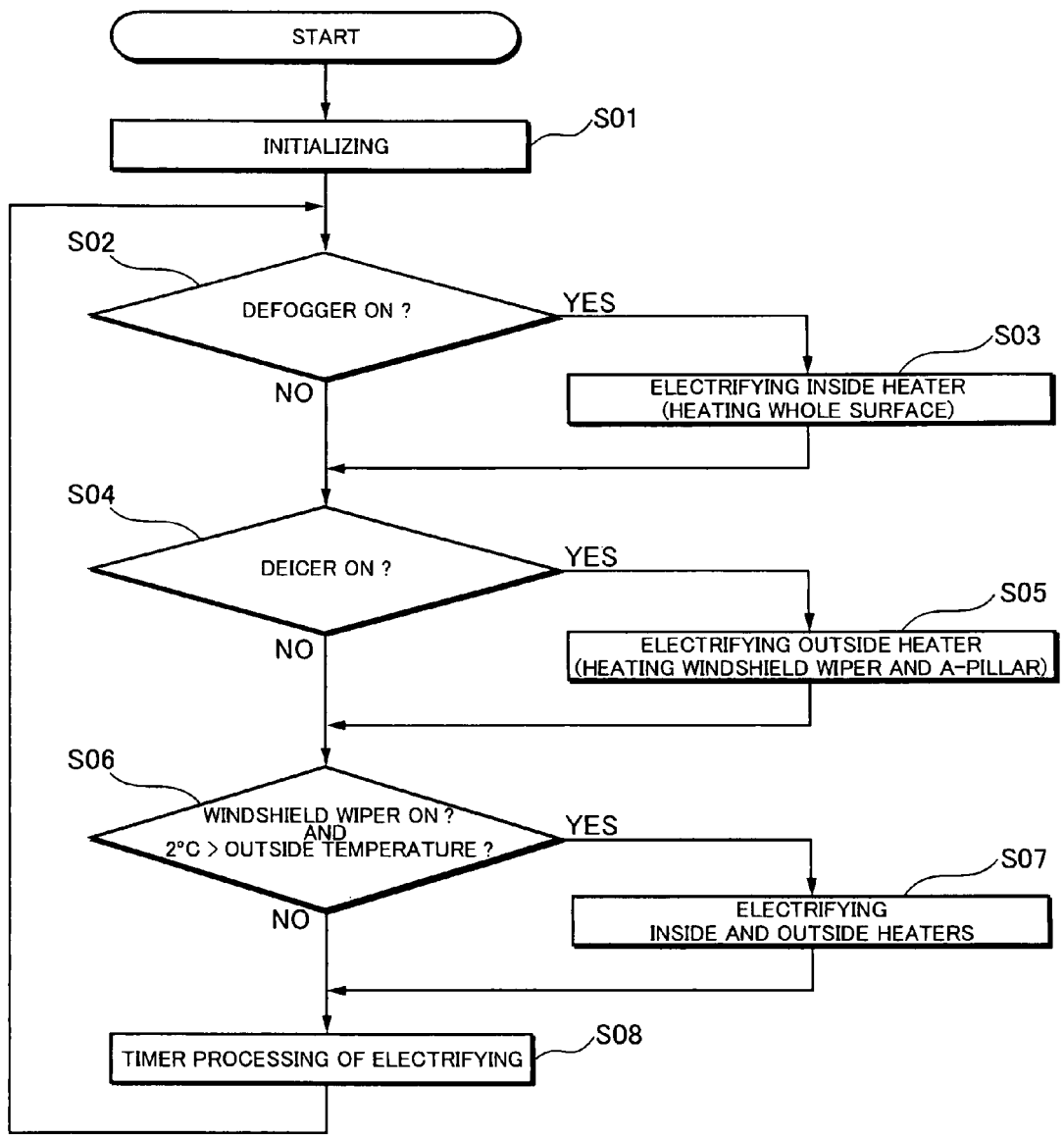
FIG. 4 is a flowchart showing operations of a defroster and a deicer in the window-glass heating device shown in FIG. 1.

Next, an operation of the aforementioned window-glass heating device 1 will be explained every step. FIG. 4 is a flowchart showing the operation of the window-glass heating device.

[Step S01: Initializing]

In Step S01, the control unit 60 initializes each of the functions of the window-glass heating device 1, and then the procedure of the control unit 60 goes forward to Step S02. The relays 40, 50 still remain "OFF".

[Step S02: Judgment of the Defogger Switch "ON/OFF"]

In Step S02, if the defogger switch is "ON", the control unit 60 judges that there is a heat generating requirement for heating the whole surface of the window glass 10, and then the procedure goes forward to Step S03; alternatively, if the defogger switch is "OFF", the control unit 60 judges that there is no heat generating requirement, and then it goes forward to Step S04.

[Step S03: Electrifying the Inside Heater]

In Step S03, the control unit 60 turns the relay 40 on and feeds electric current to the inside heater 20 in order to heat the whole surface of the window glass 10, and then the procedure goes forward to Step S04.

[Step S04: Judgment of the Deicer Switch "ON/OFF"]

In Step S04, if the windshield wiper deicer switch is "ON", the control unit 60 judges that there is a heat generating requirement for heating at least an area adjacent to a windshield wiper waiting position of the window glass 10, and then it goes forward to Step S05. If the windshield wiper deicer switch is "OFF", the control unit 60 judges that there is no heat-generating requirement, and then it goes forward to Step S06.

[Step S05: Electrifying the Outside Heater]

In Step S05, the control unit 60 turns the relay 50 on and feeds electric current to the outside heater 30 in order to heat the areas adjacent to the windshield wiper waiting position and A-pillar of the window glass 10, and then it goes forward to Step S06.

[Step S06: Judgment of the Windshield Wiper Switch "ON/OFF" and the Outside Temperature Level]

In Step S06, if the windshield wiper switch is "ON" and the outside temperature is less than 2 degrees Celsius (first threshold value), i.e., "Yes" in the procedure, the ECU 60 judges that there is the high possibility of snowfall and a heat-generating requirement for heating areas adjacent to the windshield wiper waiting position and A-pillar of the window glass 10, and thus it goes forward to Step S07. If "No", the procedure goes forward to Step S08.

[Step S07: Electrifying Inner-Outer Heaters]

In Step S07, the control unit 60 turns the relays 40 and 50 on and electrifies both the inside heater 20 and the outside heater 30 in order to heat the whole surface of the window glass 10 and the areas adjacent to the windshield wiper waiting position and A-pillar of the window glass 10 at the same time, and then it goes forward to Step S08.

[Step S08: Timer Processing of Electrifying]

In Step S08, the control unit 60 executes a predetermined timer processing for managing the electricity feeding time of the relay "ON". The timer processing includes following electricity feeding time management, that is, when a predetermined time has passed after the relay was turned on, the control unit 60 turns the relay off. The timer processing includes also the control for regulating the heat amount of each heater, that is, the control unit 60 feeds electricity intermittently by switching the relays between "ON" and "OFF", to control a duty ratio as a ratio of on-time and off-time.

In the heat amount control, the heat amount of each heater is controlled so that the lower the outside temperature is, and also the larger the temperature difference is, the higher the heat amount of each heater becomes.

Afterwards, the procedure returns to Step S02, and repeats the above process from S02 again.

Figure 5:
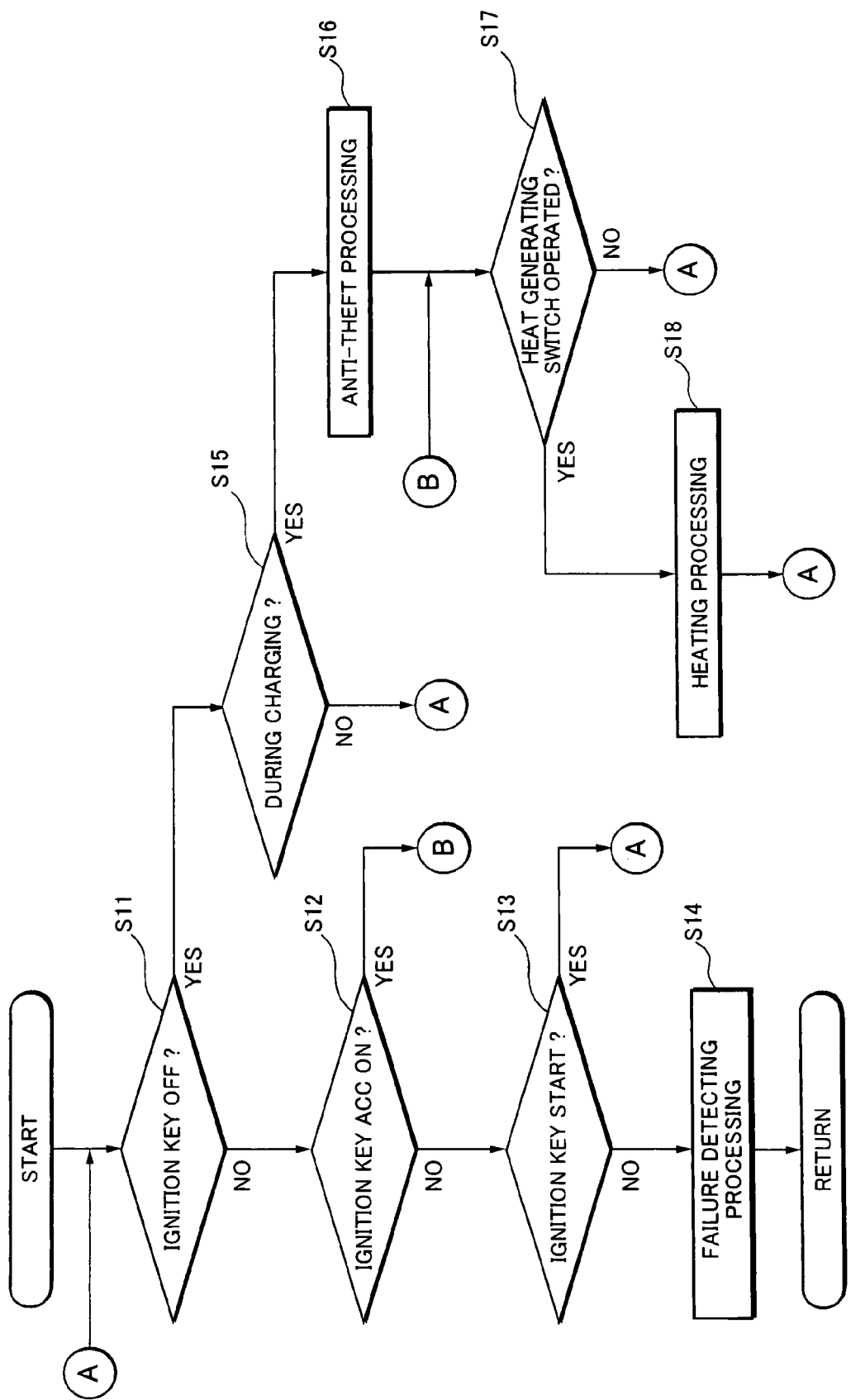
FIG. 5 is a flowchart showing operations of the window-glass heating device shown in FIG. 1 at the time of vehicle stop and parking of a vehicle.

Besides, the window-glass heating device 1 according to the first embodiment has the following three functions, i.e., an anti-theft function during charging the traction battery 70, a heat generation function during stopping and parking, and an electricity-supply stopping function at the time of starting engine. FIG. 5 is a flowchart showing these functions. Hereinafter, each step of these functions will be described in due order.

[Step S11: Judgment of the Ignition Switch "OFF"]

If the ignition switch is "OFF", the procedure of the control unit 60 goes forward to Step S15, alternatively, if "ON", to Step S12.

[Step S12: Judgment of the Ignition Switch "ACCESSORY"]

If the ignitions switch is "ACCESSORY", the procedure of the control unit 60 goes forward to Step S17, alternatively, if not "ACCESSORY", to Step S13.

[Step S13: Judgment of the Ignition Switch "START"]

If the ignition switch is "START", the control unit 60 does not feed electricity into any of heaters in order to prioritize the power supply into a starter motor, and then the procedure returns to Step S11, and repeats the processes from Step S11.

[Step S14: Fault-Detecting Processing]

The control unit 60 executes a predetermined process for detecting fault. The control unit 60 judges whether there is a fault such as an electrical leakage from the window-glass heating device or not by monitoring the heat amount of each heater.

Afterwards, the procedure of the control unit 60 returns to Step S11, and repeats the processes from S11.

[Step S15: Judgment of the Charging]

If the plug-in charge is executed by use of the battery charging port 80, the procedure of the control unit 60 goes forward to Step S16. If the plug-in charge is not executed, the procedure returns to Step S11, and repeats the processes from S11.

[Step S16: Anti-theft Processing]

The control unit 60 intermittently applies a weak electric potential difference between the electrode 22 and the electrode 23 of the inside heater 20 through controlling the relay 20, and monitors an amount of current at this time. That makes it possible to judge whether the window glass is broken and thus the heat generating film 21 is damaged or not, because the electric current does not flow by a fault of film in the broken window glass in the situation. That is, the heat generating film 21 of the inside heater 20 functions also as a sensor for detecting any damage of the window glass 10. If such a damage of the window glass 10 has been detected in this process, the control unit 60 executes a predetermined anti-theft operation cooperated with the other vehicle-mounted units. The anti-theft operation includes blinking of lamps, alerting of a horn, prohibiting an engine from starting, sending any warning information to a system outside the vehicle. Afterwards, the procedure goes forward to Step S17.

[Step S17: Judgment of Operational States Related to the Heat-generating Switch]

When any switch related to the heat-generating requirement such as the defogger switch, or the wiper deicer switch is operated, the procedure of the control unit 60 goes forward to Step S18, alternatively if not so, the procedure returns to Step S11, and repeats the processes from S11.

[Step S18: Heating Processing]

The control unit 60 feeds electricity into each of heaters depending on the operation of the switch based on a driver's heat-generation requirement in the same manner as that of FIG. 4. Afterwards, the procedure of the control unit 60 returns to Step S11, and repeats the processes from S11.

According to the aforementioned first embodiment, the following effects can be obtained.

(1) Owing to the inside heater 20 provided on the whole surface of the window glass 10 and the outside heater 30 provided near the A-pillar and the windshield wiper waiting position, the heat amount of each heater is controlled in accordance with any user's operation of each sort of switch or the outside temperature, so that the heaters of the present embodiment can have the following effects a) through d).

a) When the outside temperature is less than 2 degrees Celsius and the windshield wiper is "ON", it is judged that the vehicle is in a snowing conditions to make both the inside heater 20 and the outside heater 30 heat together. Therefore, the large amount of heat is generated in areas adjacent to the A-pillar and the windshield wiper waiting position to prevent ice and snow, which has been scraped up by the windshield wipers, from growing up lumps, and to melt them. This makes it possible that a good visibility for a driver is secured during a travel in a cold region, and also the mechanics of the windshield wiper device is protected from overload. In addition, even if the vehicle is in the situation where a voltage of the vehicle power source cannot be set high, the large amount of heat can be obtained through stacking the two layers of heaters each other.

b) Through heating only the outside heater 30, it can be used as a windshield wiper deicer to prevent a wiper blade thereof from freezing and adhering to the window glass 10. Thus, since only the parts to be heated are heated in this case, the consumed electric power can be reduced in comparison with the case that the whole surface of the window glass 10 is heated.

c) Through heating the whole surface of the window glass equally by the inside heater 20, the inside heater 20 can be used as a defroster to prevent the window glass 10 from fogging up.

d) Each heating operation of the window-glass heating devices has a subsidiary effect that the vehicle inside is also heated. In other words, hot air does not blow directly onto the respective faces of passengers like an air conditioner. Therefore, the passengers do not feel an unpleasant glow very much, and so the comfortable feeling is improved for the respective passengers.

(2) Arranging the heater for locally heating the windshield wiper waiting position at the outside of the vehicle, the outside portion of the window glass 10 is mainly heated to improve the ice-snow melting effect as the deicer. Also, arranging the heater for heating the whole surface at the inside of the vehicle, the inside portion of the window glass 10 is mainly heated to improve defogging effect as the defogger.

(3) The inside heater 20 and the outside heater 30 are arranged with sandwiched in-between the inner glass 11 and the outer glass 12 of the window glass as a laminated glass, so that it is possible to protect each of heaters by the inner glass 11 and outer glass 12, resulting in improving durability thereof. In addition, the nonconductive and transparent intermediate film 13 is arranged between the inside heater 20 and the outside heater 30, so that the respective heat-generating films of heaters can be isolated each other.

(4) Since a little weak electric current is fed into the inside heater 20 at the time of parking or stopping of vehicle, and the amount of current at this time is monitored according to the present invention, this feature makes it possible to detect that the window glass 10 was broken, that is, resulting in utilizing the inside heater 20 for anti-theft.

(5) Even if it is the timing when the plug-in charge is being performed, the electric power is supplied into each heater if any heat-generating requirement has been made in advance. This feature makes it possible to secure the driver's good visibility through the window glass 10 in advance before starting the engine and to start a vehicle soon, even if it is under any cold season or district.

[The Second Embodiment]

Hereinafter, the second embodiment of the window-glass heating device according to the present invention will be described referring to FIGS. 6 to 9.

Figure 6:
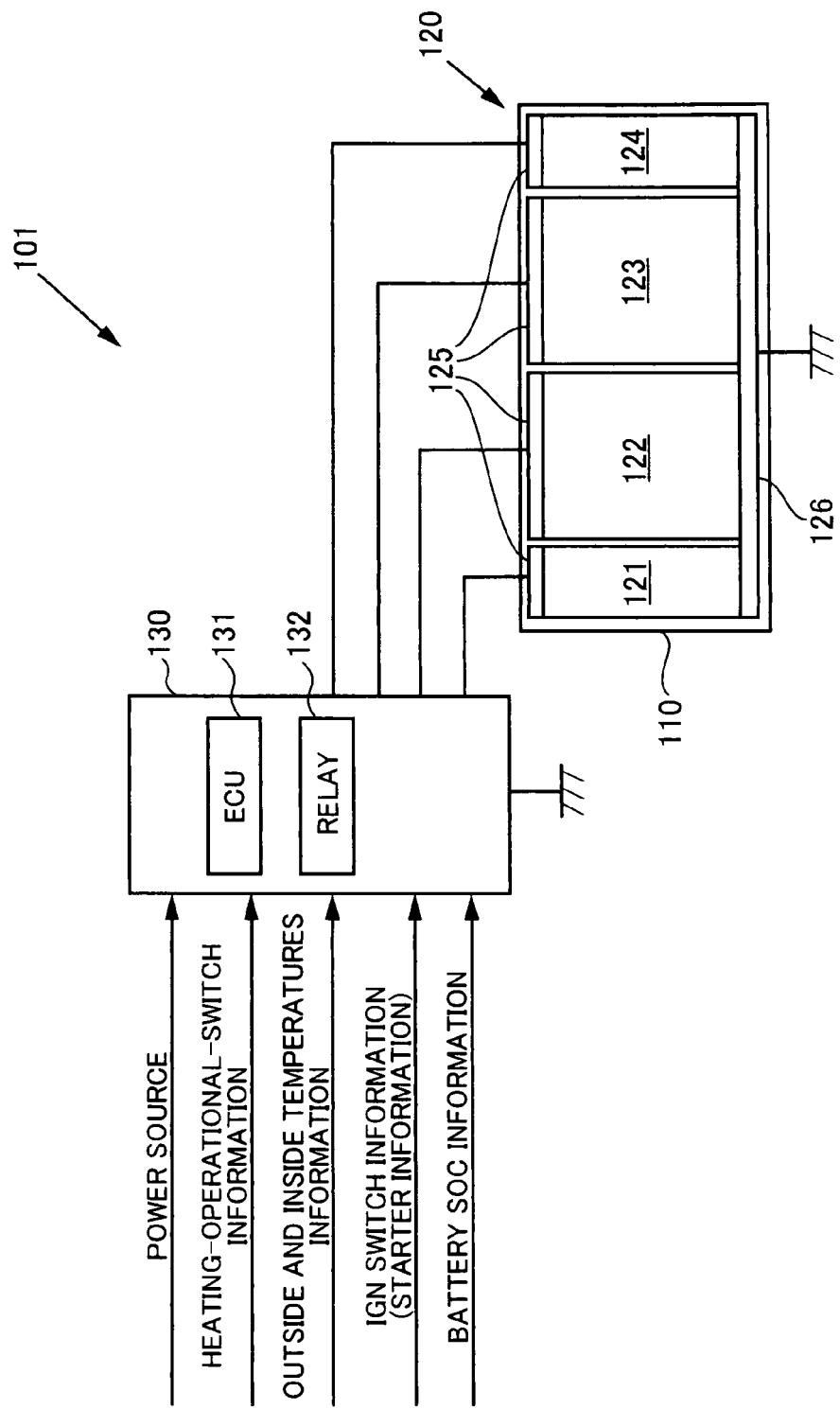
FIG. 6 is a block diagram showing a construction of a window-glass heating device in accordance with the second embodiment of the present invention.

FIG. 6 is a block diagram showing a construction of the window-glass heating device according to the second embodiment. In the case that the components of the second embodiment are the same as those of the first embodiment, their explanations will be omitted.

A window-glass heating device 101 is formed from the components such as a window glass 110, a glass heater 120, and a heater control/electric power supply unit 130.

The window glass 110 is a laminated glass formed with substantially elongated and rectangular shape, the lamination of which is formed by an inner glass and an outer glass. The arrangement of the window glass 110 is the same as that of the window glass 10 of the first embodiment.

The glass heater 120 is provided between the inner glass and the outer glass of the laminated window glass 110. The glass heater 120 comprises a first heat generating film 121, a second heat generating film 122, a third heat generating film 123, a fourth heat generating film 124, positive electrodes 125 and a grounding electrode 126.

The heat generating films 121 to 124 are thin films, for example, made of tin oxide, which are formed by evaporation on a surface of the inner glass at the side of the vehicle outside or a surface of the outer glass at the side of the vehicle inside. Each of the heat generating films 121 to 124 is transparent or semi-transparent, and also conductive to be heated by electrifying.

Each of the heat generating films 121 to 124 is formed with rectangular shape, being arranged sequentially in the width direction. They are insulated electrically each other. In addition, the heat generating films 121 to 124 are disposed in such a manner as to cover the whole surface of the window glass 110 by use of all these films together.

The heat generating films 122 and 123 are arranged on an area including the center area of the window glass 110, which correspond to the first heating means according to the present embodiment. Further, the heat generating films 121 and 124 are arranged near the A-pillar (not illustrated) of the vehicle body, which correspond to the second heating means according to the present invention.

These heat-generating films 121 to 124 can be formed in a single evaporating process in such a manner as to provide masking on an area of the window glass corresponding to boundary between each of the films before the evaporating, removing the mask after having formed the film.

The positive electrodes 125 provides the heat generating films 121 to 124 with the respective electrodes, which are disposed on the top end portion of each of the heat generating films 121 to 124, respectively, and connected to the heater control/power supply unit 130 electrically.

The grounding electrode 126 is formed with band-shape elongated in the width direction, and integrally disposed at the lower end portion of heat generating films 121 to 124 in succession and grounded.

The heater control/power supply unit 130 supplies electric power into each of heat generating films 121 to 124 to generate heat and controls "ON" and "OFF" of the electrical supply or electrifying amount thereof when the electrical supply is turned on. The heater control/power supply unit 130 serves as both the heat-generating requirement detecting means and the heat generating control means according to the present invention. The heater control/power supply unit 130 receives electric power supply from a vehicle-mounted power source such as battery, and controls the power supply into each of heat generating films 121 to 124 depending on heating operational switch information, inside-outside temperature information, ignition switch information and the state of battery charge information (SOC).

The heating operational switch information as mentioned above is information concerned with window glass heat generating requirement which is inputted directly from an operating section such as a defogger switch or a windshield wiper deicer switch provided on an instrument panel (not illustrated), or indirectly as pre-heat requirement according to a traveling schedule. The heat-generating requirement is inputted by not only the operating section provided on the vehicle body but also a remote operation from the vehicle exterior, for example. In addition, the heater control/power supply unit 130 acquires also information concerning operational states of the windshield wiper switch for operating the windshield wiper set "ON" or "OFF".

Further, the battery SOC information is concerned with the state of charge (remaining electric power amount) of the battery.

The heater control/power supply unit 130 comprises an ECU 131 and a relay 132 and so on.

The ECU 131 is an information-processing device for executing all control of the window-glass heating device 101. The relay 132 is an interrupting device for switching the power supply into each heat generating film set "ON" or "OFF". In addition, the relay 132 has a function as changing an interrupted period (duty ratio) of the power supply, that is, changing the amount of heat generated in each heat generating film 121 to 124.

Figure 7:
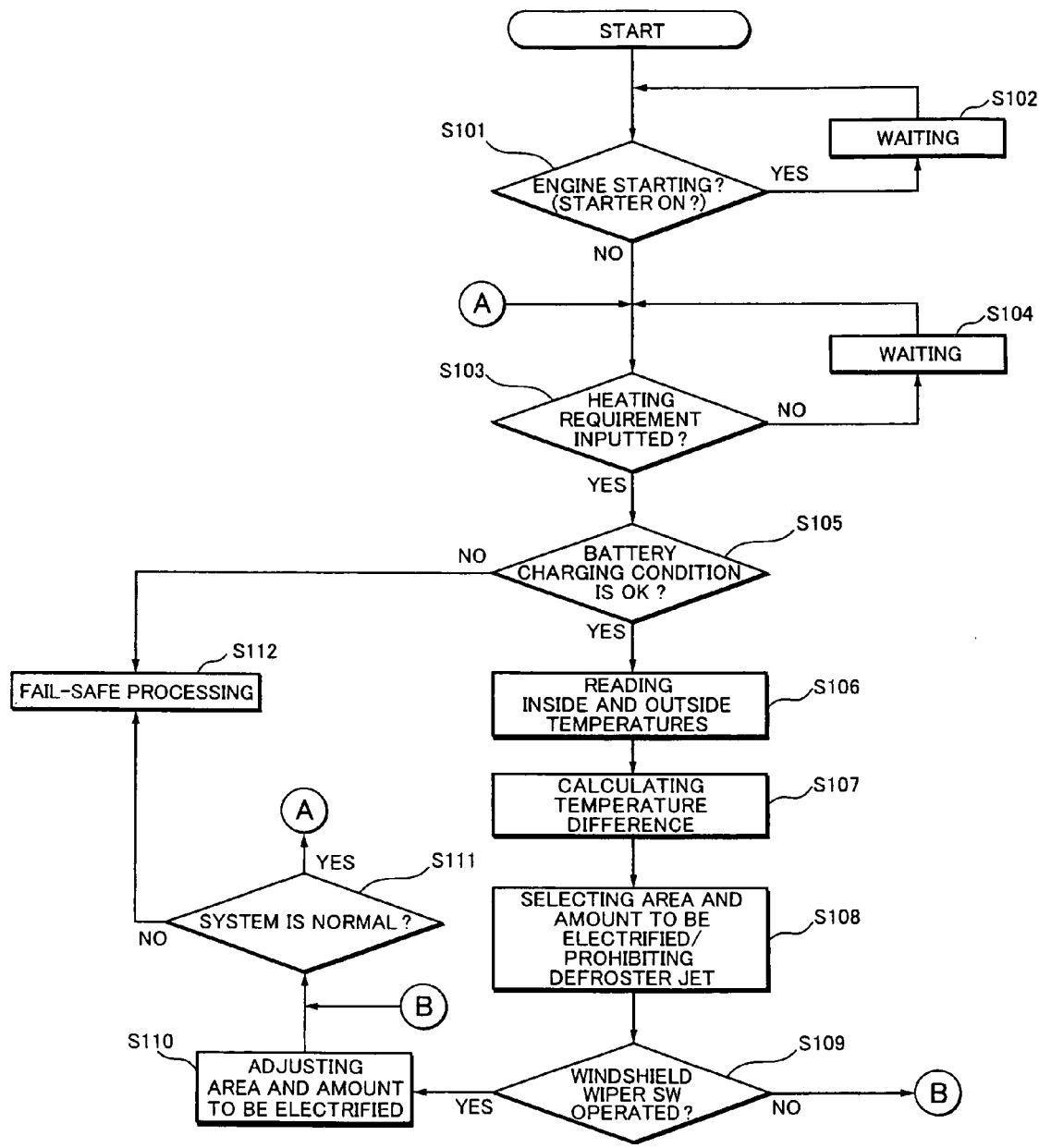
FIG. 7 is a flowchart showing operations of the window-glass heating device shown in FIG. 6.

Next, an operation of the aforementioned window-glass heating device 101 will be described. FIG. 7 is a flowchart showing the operation of the window-glass heating device 101 according to the present embodiment. Hereinafter, each step will be described in due order.

[Step S101: Judgment of Engine Starting]If the ignitions switch is "START", the procedure of the ECU 131 goes forward to Step S102 in order to prioritize the power supply into a starter motor, alternatively if not so, to Step S103.

[Step S102: Waiting]

The ECU 131 intermits the process in the predetermined time, for example, several seconds, and then the procedure returns to Step S101 and repeats processes from S101.

[Step S103: Judgment of Heat Generating Requirement]

When any one of heat generating requirement switches such as the defogger switch or wiper deicer switch is "ON" or will be "ON" before long by an order in advance, the ECU 131 judges that there is a heat generating requirement, and the procedure goes forward to Step S105, alternatively if not so, to Step S104.

[Step S104: Waiting]

The ECU 131 intermits the process in the predetermined time, for example, several seconds, and then the procedure returns to Step S103 and repeats processes from S103.

[Step S105: Judgment of Battery Charging Condition]

If a battery charging condition is equal or more than a predetermined level and has an enough remaining electric power amount, the procedure of the ECU 131 goes forward to Step S106. In the case, however, that a battery charging condition is less than a predetermined level and the remaining electric power amount is not enough, the procedure goes forward to Step S112.

[Step S106: Reading the Inside-Outside Temperature In]

The ECU 131 reads the outside and inside temperatures in from temperature sensors provided in both the sides of the vehicle outside and inside, respectively, and then the procedure goes forward to Step S107.

[Step S107: Calculating Temperature Difference]

The ECU 131 calculates the difference between outside and inside temperatures, which has been read in Step S06, and then the procedure goes forward to Step S108.

[Step S108: Process for Selecting Area and Amount to be Electrified and for Prohibiting Defroster Jet]

The ECU 131 selects heat generating films as target to be electrified, thereby sets an area to be electrified (heating area), and then decides an amount to be electrified, and controls the relay 132 to start electrifier to the area.

In addition, the ECU 131 takes command to an air condition control unit through a vehicle-mounted LAN such as CAN to prohibit a defroster from jetting out hot air onto the window glass 110.

A method for setting an area and an amount to be electrified will be hereinafter described in detail.

The area to be electrified is set on the basis of both the outside temperature read in Step S106 and the outside and inside temperature difference computed in Step S107 according to a predetermined setting map related to the area to be electrified.

Figure 8:
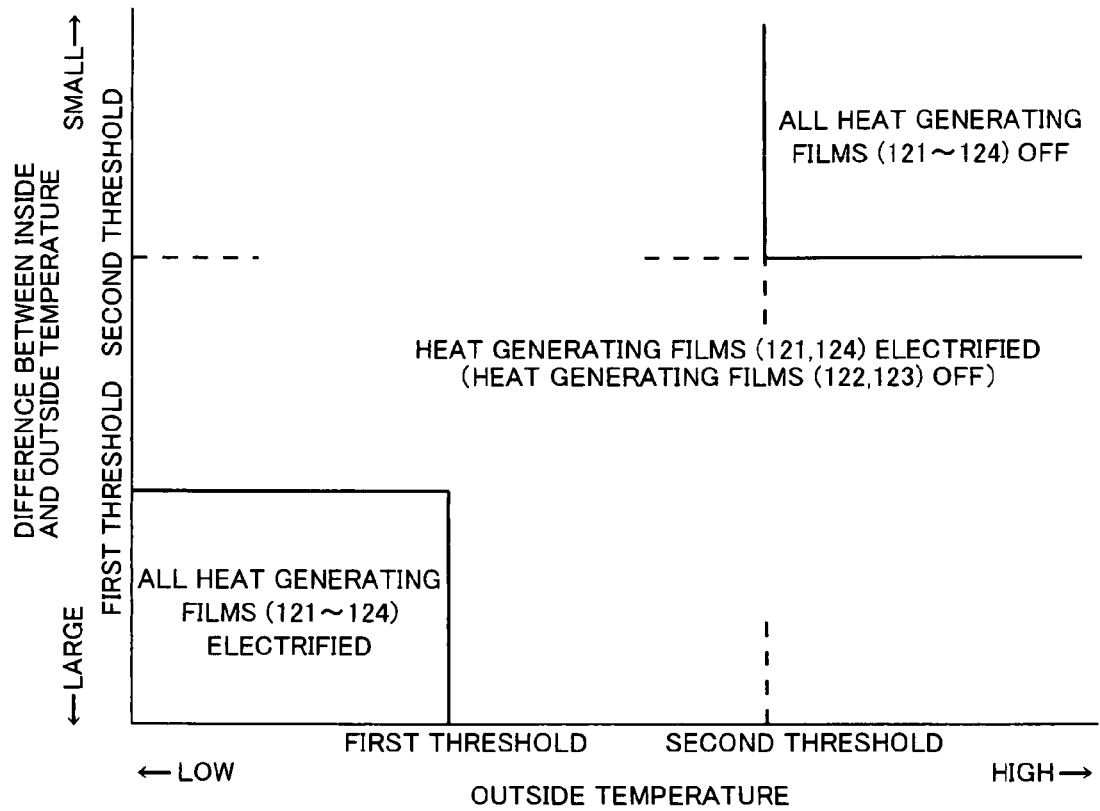
FIG. 8 is a schematic view showing an electrified area setting map of the window-glass heating device shown in FIG. 6.

FIG. 8 is a schematic view showing the setting map of the carrying current area. In FIG. 8, the x-axis shows outside temperature and the y-axis shows the temperature difference. As shown in FIG. 8, when the outside temperature is lower than the first threshold value, for example 2° C., and the temperature difference is larger than the first threshold value, all heat generating films 121 to 124 are electrified.

Besides, when the outside temperature is higher than a second threshold value which is set higher than the first threshold value, and when the temperature difference is smaller than a second threshold value, which is set smaller than the first threshold value, all heat generating films 121 to 124 are disconnected electrically depending on such judgment. In other words, freezing and adhering on the window glass 110 are not generated, and fogging generates hardly, therefore defogging by an air conditioner is sufficient.

In the other cases, the first heat generating film 121 and the fourth heat generating film 124 arranged adjacent to A-pillars are electrified, and the second heat generating film 122 and the third heat generating film 123 are disconnected electrically.

The electrified current amount is set depending on both the outside temperature read in Step S106 and the temperature difference computed in Step S107 according to a predetermined setting map related to the electrified current amount.

Figure 9:
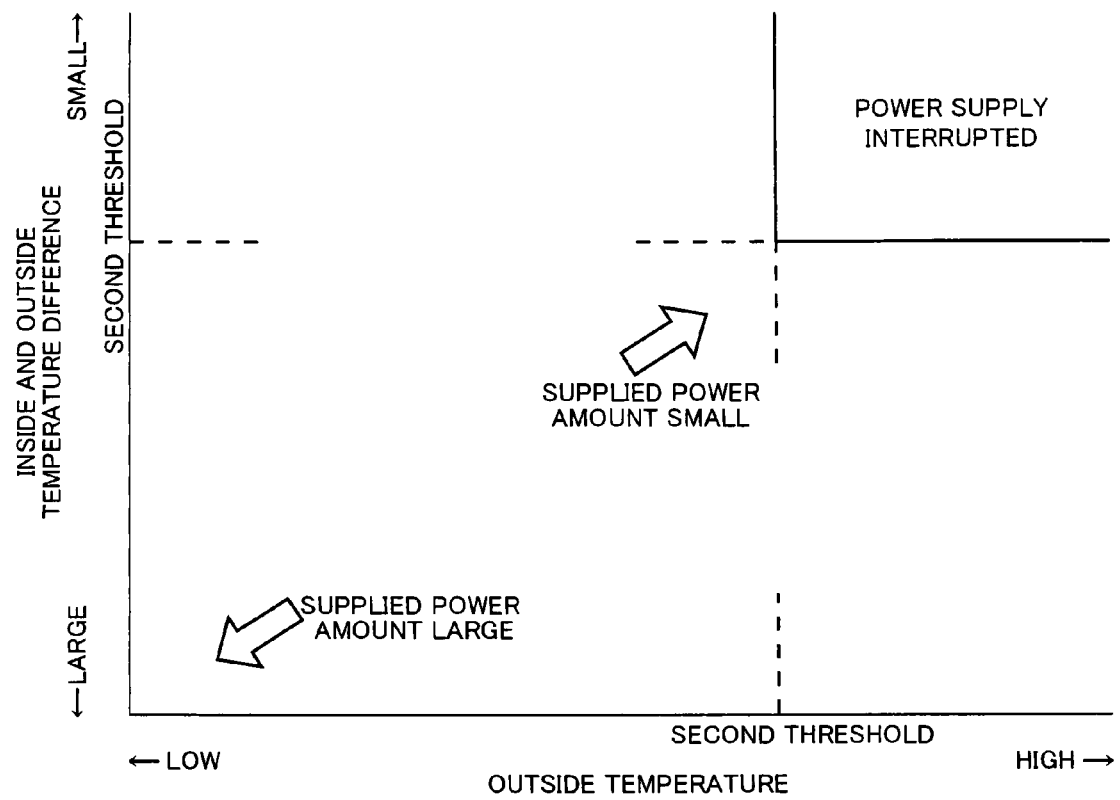
FIG. 9 is a schematic view showing an electrified amount setting map of the window-glass heating device shown in FIG. 6.

FIG. 9 is a schematic view showing the setting map of the electrified current amount. In FIG. 9, the x-axis shows outside temperature and the y-axis shows the inside-outside temperature difference. When the outside temperature is higher than the aforementioned second threshold value and the temperature difference is smaller than the aforementioned second threshold value, all heating means 121 to 124 are disconnected electrically.

In the others cases, the electrified current amount is set so that the lower the outside temperature is and the larger the temperature difference is, the more the duty ratio increases to add the electrified current amount and the heat amount. After having started to electrify each of heat generating films 121 to 124 in the area and amount to be electrified which are set through the foregoing method, the procedure of the ECU 131 goes forward to Step S109.

[Step S109: Judgment of Operation of the Windshield Wiper Switch]

When the windshield wiper switch is "ON", the procedure of the ECU 131 goes forward to Step S110. When the windshield wiper switch is "OFF", the procedure goes forward to Step S111.

[Step S110: Adjusting Area and the Amount to be Electrified]

The ECU 131 estimates that the outside temperature is less than, for example, 20C, if there is such a detection in Step S109 that the windshield switch is "ON", namely that it is snowing. If the second heat generating film 122 and the third heat generating film 123 are "OFF", the ECU 131 switches them to "ON". At the same time, the ECU 131 executes such an adjustment as to increase the amount of supplying power into the first heat generating film 121 and the second heat generating film 124 adjacent to the A-pillars in order to prevent scratched snow from growing ice lumps.

[Step S111: System Check]

The ECU 131 diagnoses each function of the window-glass heating device 101 by a predetermined self-diagnostic function. After judging that the functions are normal, the procedure of the ECU 131 returns to Step S103 and repeats the following processes. If a failure has been detected, the procedure goes forward to Step S112.

[Step S112: Fail-Safe Processing]

The ECU 131 disconnects all heat generating films 121 to 124 electrically, and the procedure quits a series of processes.

The window-glass heating device 101 according to the aforementioned second embodiment has the following effects.

(1) In the case that the window glass 110 is to be heated in areas adjacent to the A-pillars thereof, heating only the heat-generating films 121, 124 provided near the areas enables the effective heating to be accomplished. Hereby, the periphery portions of the window glass 110, which is apt to be fogged up, can be mainly heated efficiently, and it can prevent snow scratched by the wiper from growing ice lumps. Further, in the case that the whole surface of window glass has to be heated for preventing the glass from fogging up, the whole surface of the window glass can be heated through heating all the heat-generating films 121 to 124.

In addition, since the window glass 110 is directly heated in the above case, the better energy efficiency in comparison with the other ways for eliminating fog, i.e., heating glass through blowing hot air onto it utilizing an air conditioner, or dehumidifying the air inside the vehicle can be obtained.

(2) Since the glass heater 120 has the transparent or semi-transparent heat-generating film, it can be disposed within a visual range of the window glass 110 without blocking driver's view.

(3) Depending on any heat generating requirement based on the inside-outside temperature difference and outside temperature, it is possible to switch heat-generating films to be heated, that is, only the first heat-generating film 121 and the fourth heat-generating film 124, otherwise all the heat generating films 121 to 124 may be heated selectively. In addition, depending on the heating requirement, it is also possible to change the amount of heat of each heat generating film 121 to 124. These features can give the driver the best heating condition in accordance with the weather automatically. In addition, these advantages enable the user to secure a good visibility during traveling even in a cold region without a complicated operation conducted by the user.

[Modification]

The present invention is not limited to the aforementioned embodiments. A variety of modifications and changes are applicable within a technical range of the present invention.

(1) The components of the window-glass heating device are not limited to the aforementioned embodiments. An adequate change of the components is applicable. For example, an ingredient of the heat generating film is not limited to the material based on tin oxide according the present embodiments. A heat generating film including other metallic or nonmetallic material is applicable, if it is transparent or semi-transparent.

(2) The window-glass heating device according to the aforementioned embodiments is provided on a vehicle such as a plug-in hybrid type automobile. The present invention is not limited to only this type, but also is applicable to a vehicle such as an automobile whose travelling power source is only an engine, a battery type electrical mobile, fuel battery automobile and the like.

(3) The second heating means according to the present embodiment is arranged in the area adjacent to the A-pillar and the windshield waiting position. The present invention, however, is not limited to this arrangement. The second heating means may be disposed in the other areas where relative greater heating amount is demanded, for example, an area facing an automotive-surrounding photographing device such as a stereo camera or the like, which is utilized as a drive supporting device.

(4) The window glass according to the present embodiments comprises a laminated glass. However, a single layer glass may be also utilized for a rear window glass. In this case, it is preferable that each heating means is arranged on the interior surface of the window glass inside the vehicle to prevent any damage caused by the windshield wiper scratching and the like from occurring. For example, however, use of a protective film makes it possible to arrange on the exterior surface of the window glass outside the vehicle. In this case, it is possible to construct the window glass in such a manner that the first and second heat-generating means sandwich the window glass together, otherwise, that both heat-generating means are arranged together in the side of the vehicle inside or in the side of the vehicle outside. In the case that both heat-generating means are arranged together in either side of the vehicle inside or outside, an insulated film may be disposed between each heating means.

(5) In the present embodiments, for example, two heat-generating means are provided, but it is possible to utilize combinations of the other heat-generating means or heating means. For example, it is also possible that heat generating films are so arranged as to be laid by more than three layers. Otherwise, such combinations are utilizable, that a windshield wiper deicer using a resistant heating wire, a defroster using together hot air generated by an air conditioner, a heating unit and the like are combined with the window-glass heating device according to the prevent invention. Meanwhile, the adoption of the window glass heating means according to the present invention makes it possible that it dispenses with the air conditioner and equipments for defrosting such as a jet, a duct and the like. As a result, it is possible to enhance the freedom of architectural design and lay out in the instrument panel; and also to prevent any noise and stink during the air conditioner operation caused by intrusion of dust into the duct and the like from occurring.

(6) In the present embodiments, both of first and second heating means comprise a transparent or semi-transparent heat generating film. The present invention is not limited to this composition, but an opaque heating means such as resistance-heating wire, carbon or the like may serve as the second heating means, in which it is arranged out of the visual range (in the colored part or the ceramic part)of the window glass.

(7) The areas of the window glass may be vertically divided under the consideration that hot air tends to rise instead of laterally divided areas according to the second embodiment.

(8) The window-glass heating device according to the embodiments sets the area and the amount to be electrified based on both the outside temperature and the inside-outside temperature difference. The window-glass heating device, however, can employ a control based on either the outside temperature or the temperature difference. In addition, a control based on the other parameters is applicable. For example, the window-glass heating device can be so constructed, as to enlarge and increase the area and the amount to be electrified by a control based on a humidity sensor provided in the side of the vehicle inside, if the humidity is high. Besides, a cooling effect by traveling wind can be taken into consideration in setting the amount to be electrified and the like.

(9) In the window-glass heating device according to the second embodiment, boundaries between heat generating films close to each other are formed by masking. The formation method of the films is not limited to this method. For example, after forming one sheet of film equally, the film may be cut by laser to form the boundaries.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A window-glass heating device, comprising:
   first heating means comprising a first heat generating film being transparent or semi-transparent and attached on a substantially whole surface of an automotive front window glass, a windshield wiper and pillars being attached to the automotive front window glass;
   second heating means comprising a second heat generating film being transparent or semi-transparent and having a substantially U-shape to be attached on a periphery area of the automotive front window glass so as to be overlapped with a first portion of the first heat generating film, the periphery area comprising a lower end portion of said automotive front window glass including a windshield wiper waiting position, and a left side end portion and a right side end portion adjacent to said pillars of said automotive front window glass such that a second portion of the first heat generating film, extending between the left side end portion and the right side end portion of the periphery area, is uncovered by the second heat generating film,
   heating-requirement detecting means for detecting a heating requirement depending on at least one of an outer air condition, an inner air condition, and an operational input from an operational equipment provided in a compartment of a vehicle; and heating control means for controlling a heat amount by controlling an amount of heat of each of said first and second heating means independently depending on the heating requirement, wherein said automotive front window glass comprises a laminated glass overlapped by an outer glass and an inner glass with respect to an interior of the vehicle, wherein said first heating means is attached on a first surface of said inner glass, said first surface of said inner glass facing said outer glass, wherein said second heating means is attached on a first surface of said outer glass, said first surface of said outer glass facing said inner glass, and wherein said heating control means switches heating between a first heating caused by operating only said second heating means and a second heating caused by operating both said first heating means and second heating means depending on the detected heating requirement.

2. The window-glass heating device according to claim 1, wherein said heating control means controls heating of said first heating means when said heating control means controls heating of said second heating means.

3. The window-glass heating device according to claim 1, wherein said second heating means is provided in at least one area including one of an area adjacent to a windshield wiper waiting position, an area near a movable end of the wiper opposite to said windshield wiper waiting position, and an area facing an automotive surrounding photographing device.

4. The window-glass heating device according to claim 1, wherein a non-conductive transparent film is arranged between said first heating means and said second heating means.

5. The window-glass heating device according to claim 1, wherein said second heating means is provided on said peripheral area of said automotive window glass adjacent to said first heating means.

6. The window-glass heating device according to claim 5, wherein said second heating means comprises a heat generating film attached on an area adjacent to said heat generating film of said first heating means.

7. The window-glass heating device according to claim 6, wherein said second heating means is provided in at least one area of said automotive window glass including one of a windshield wiper waiting position, an area opposite to said windshield wiper waiting position, and an area facing an automotive surrounding photographing device.

8. The window-glass heating device according to claim 5, wherein said heating requirement includes at least one of an inside-outside temperature difference and an outside temperature.

9. The window-glass heating device according to claim 5, wherein said heating requirement includes at least one of an inside-outside temperature difference and an outer temperature, and wherein said heating control means changes a respective heat amount of said first and second heating means depending on said heating requirement.

10. A window-glass heating apparatus, comprising:
an inner-glass structure;
an outer-glass structure associated with the inner-glass structure and adjacent to the inner-glass structure;
a first heater associated with an exterior surface of the inner-glass structure, the first heater having an elongated, rectangular shape covering a substantially whole surface of the inner-glass structure, said first heater covering said surface of said inner-glass structure excluding a surface at a periphery part of the inner-glass structure;
a second heater associated with an interior surface of the outer-glass structure, the second heater covering an area of the outer-glass structure corresponding to a lower part, a right part, and a left part, said area being arranged in a substantial U-shape comprising the left part, the lower part, and the right part of the outer-glass structure, respectively, the second heater being overlapped with a first portion of the first heater such that a second portion of the first heater, extending between the left part and the right part, is uncovered by the second heater;
a first relay configured to supply power to the first heater;
a second relay configured to supply power to the second heater for heating the lower part of said outer-glass structure including a windshield wiper waiting position, and the left part and a right part adjacent to pillars of said outer-glass structure; and
a control unit configured to control the first relay and the second relay independently depending on a heating requirement,
wherein said control unit switches heating between a first heating caused by operating only said first heater and a second heating caused by operating both said first heater and said second heater depending on the heating requirement.

11. The window-glass heating apparatus of claim 10, further comprising an intermediate film provided between the inner-glass structure and the outer-glass structure.

12. The window-glass heating apparatus of claim 10, wherein the lower part of the outside heater is located in the windshield wiper waiting position area of the outer-glass structure.

13. The window-glass heating apparatus of claim 10, further comprising an outside temperature gauge configured to measure an exterior temperature of a vehicle associated with the window-glass heating apparatus.

14. The window-glass heating apparatus of claim 13, wherein, when a windshield wiper associated with the window glass heating unit is operated and when the outside temperature gauge detects an outside temperature close to or below a freezing temperature, the control unit controls the first relay to provide power to the first heater and the second relay to provide power to the second heater.

15. The window-glass heating apparatus of claim 10, wherein, in a windshield wiper deicer mode, the control unit controls the second relay to provide power to the second heater.

16. The window-glass heating apparatus of claim 10, wherein, in a defog mode, the control unit controls the first relay to provide power to the first heater.

17. The window-glass heating apparatus of claim 10, wherein, after a first predetermined time, the control unit turns off the first relay, and
wherein, after a second predetermined time, the control unit turns off the second relay.

18. The window-glass heating apparatus of claim 13, further comprising an interior temperature gauge configured to measure an interior temperature of a vehicle which includes the window-glass heating apparatus,
wherein, when a difference in temperature between the exterior temperature and the interior temperature is relatively high and the exterior temperature is relatively low, the control unit controls the first relay to provide power to the first heater and the second relay to provide power to the second heater, and wherein, when the difference in temperature between the exterior temperature and the interior temperature is relatively low and the exterior temperature is relatively high, the control unit controls the first relay not to provide power to the first heater and the second relay not to provide power to the second heater.

19. A window-glass heating device, comprising:

first heating means comprising a first heat generating film being transparent or semi-transparent and attached on a substantially whole surface of an automotive front window glass, a windshield wiper and pillars being attached to the automotive front window glass;

second heating means comprising a second heat generating film being transparent or semi-transparent and having a substantially U-shape to be attached on a periphery area of the automotive front window glass so as to be overlapped with a first portion of the first heat generating film, the periphery area comprising a lower end portion of said automotive front window glass including a windshield wiper waiting position, and a left side end portion and a right side end portion adjacent to said pillars of said automotive front window glass such that a second portion of the first heat generating film, extending between the left side end portion and the right side end portion of the periphery area, is uncovered by the second heat generating film, heating-requirement detecting means for detecting a heating requirement depending on at least one of an outer air condition, an inner air condition, and an operational input from an operational equipment provided in a compartment of a vehicle; and heating control means for controlling a heat amount by controlling an amount of heat of each of said first and second heating means independently depending on the heating requirement, wherein said automotive front window glass comprises a laminated glass overlapped by an outer glass and an inner glass with respect to an interior of the vehicle, wherein said first heating means is attached on a first surface of said inner glass, said first surface of said inner glass facing said outer glass, wherein said second heating means is attached on a first surface of said outer glass, said first surface of said outer glass facing said inner glass, and wherein said heating control means:
heats a whole surface of said automotive front window glass by switching said first heating means when said heating-requirement detecting means detects a defogger operation;

heats said windshield wiper and pillars by switching said second heating means when said heating-requirement detecting means detects a deicer or a defogger operation; and heats said automotive front window glass by switching said first heating means and said second heating means when said heating requirement detecting means detects a windshield wiper operation and the outside temperature is less than 2 degrees Celsius.

* * * * *